United States Patent
Verheyen et al.

(10) Patent No.: US 9,797,740 B2
(45) Date of Patent: Oct. 24, 2017

(54) METHOD OF DETERMINING TRAJECTORIES THROUGH ONE OR MORE JUNCTIONS OF A TRANSPORTATION NETWORK

(71) Applicant: TomTom Belgium N.V., Amsterdam (NL)

(72) Inventors: Koen Verheyen, Oudenaarde (BE); Chris Poppe, Huise (BE); Joachim De Witte, Merelbeke (BE)

(73) Assignee: TomTom Global Content B.V., Amsterdam (NL)

( * ) Notice: Subject to any disclaimer, the term of this patent is extended or adjusted under 35 U.S.C. 154(b) by 0 days.

(21) Appl. No.: 14/646,738

(22) PCT Filed: Nov. 25, 2013

(86) PCT No.: PCT/EP2013/074657
§ 371 (c)(1),
(2) Date: May 22, 2015

(87) PCT Pub. No.: WO2014/080023
PCT Pub. Date: May 30, 2014

(65) Prior Publication Data
US 2015/0285656 A1  Oct. 8, 2015

(30) Foreign Application Priority Data
Nov. 23, 2012 (GB) .................................. 1221150.4

(51) Int. Cl.
*G01C 21/34* (2006.01)
*G01C 21/36* (2006.01)
(Continued)

(52) U.S. Cl.
CPC ......... *G01C 21/3667* (2013.01); *G01C 21/32* (2013.01); *G01S 19/13* (2013.01); *G08G 1/0129* (2013.01); *H04W 4/023* (2013.01)

(58) Field of Classification Search
CPC .... G01C 21/32; G01C 21/3667; G01C 21/36; G01S 19/13; G08G 1/0129; H04W 4/023; H04W 4/02
(Continued)

(56) References Cited

U.S. PATENT DOCUMENTS

| | | | |
|---|---|---|---|
| 8,224,348 B2 * | 7/2012 | Bolon ................... | H04W 24/08 455/414.1 |
| 2011/0151839 A1 * | 6/2011 | Bolon ................... | H04W 24/08 455/414.1 |

(Continued)

FOREIGN PATENT DOCUMENTS

| | | |
|---|---|---|
| CN | 101127159 A | 2/2008 |
| CN | 102057402 A | 5/2011 |
| WO | 2009053146 A1 | 4/2009 |

OTHER PUBLICATIONS

Stefan Schroedl et al: "Mining GPS Traces for Map Refinement", Data Mining and Knowledge Discovery, Kluwer Academic Publishers, BO, vol. 9, No. 1, Jul. 1, 2004 pp. 59-87, XP019277108, ISSN: 1573-756X paragraph [0006]; figures 10,14.
(Continued)

Primary Examiner — Muhammad Shafi (57) ABSTRACT

A method of determining trajectories (1810-1813) through at least one junction of a transportation network for display on a visual representation of a digital map, the digital map comprising data that is a digital representation of the transportation network. The method comprises obtaining positional information relating to the movement of a plurality of mobile devices with respect to time on the transportation network through an area (1801) comprising the at least one
(Continued)

junction, the border of the area being divided into a plurality of segments. The positional information is used to create an entry histogram (1802) by determining a count of positional information that enters the area at each segment of the border and an exit histogram (1804) by determining a count of positional information that exits the area at each segment of the border; the histograms subsequently being used to define one or more entry (1806) and exits (1808) gates into and out of the area (1801). A trajectory through the area is assigned to pairs of entry and exit gates using the positional information.

15 Claims, 9 Drawing Sheets

(51) Int. Cl.
*G01C 21/32* (2006.01)
*G08G 1/01* (2006.01)
*G01S 19/13* (2010.01)
*H04W 4/02* (2009.01)

(58) Field of Classification Search
USPC ............... 701/428, 431, 432, 429, 436, 437, 701/440–500, 440–50; 340/994, 995.19, 340/995.21, 995.1–996
See application file for complete search history.

(56) References Cited

U.S. PATENT DOCUMENTS

| | | | |
|---|---|---|---|
| 2013/0023247 A1* | 1/2013 | Bolon | H04W 24/08 455/414.1 |
| 2013/0311076 A1* | 11/2013 | Mieth | G01C 21/32 701/119 |
| 2014/0045529 A1* | 2/2014 | Bolon | H04W 4/028 455/456.1 |

OTHER PUBLICATIONS

International Search Report dated Feb. 21, 2014 for International Application No. PCT/EP2013/074657.

* cited by examiner

METHOD OF DETERMINING TRAJECTORIES THROUGH ONE OR MORE JUNCTIONS OF A TRANSPORTATION NETWORK

CROSS-REFERENCES TO RELATED APPLICATIONS

The present application is the National Stage of International Application No. PCT/EP2013/074657, filed Nov. 25, 2013 and designating the United States, which claims priority from United Kingdom Patent Application No. 1221150.4, filed on Nov. 23, 2012. The entire content of these applications is incorporated herein by reference.

FIELD OF THE INVENTION

The present invention generally relates to methods of creating, updating and correcting digital maps representing a network of navigable segments, for example, of a transportation network. More specifically, at least some embodiments, relate to methods and systems for extracting and displaying driving trajectories through an area over one or more junctions from positional information relating to the movements of a plurality of mobile devices, e.g. GPS trace data, for use in validating and updating digital map information for the one or more junctions.

BACKGROUND OF THE INVENTION

A transportation network is any navigable system of roads, pedestrian walkways, paths, rivers, shipping lanes or other network that is utilized to transport humans or vehicles. A transportation network can also include combinations of routes for the above modes of transportation. These combinations of routes are referred to as multimodal transportation networks. A segment of a transportation network (referred to as a transportation network segment) is a portion of the transportation network that represents a path of travel for a vehicle or pedestrian without a method of entry or exit other than at its end points.

A transportation network can be modelled and stored as a digital representation in a digital map database. In so doing, the transportation network is usually represented as a plurality of navigable segments (or "links") connected at nodes, with attributes being associated with the links and/or nodes. Nodes are therefore connectors between the links, and generally occur at intersections where there is a decision point with respect to travel from one navigable segment to another. Conventionally, in the context of a transportation network, the attributes limit how travel can flow on the network. For example, attribution may include: geometry, speed of travel, whether or not a turn at an intersection is allowed (i.e. allowable "manoeuvres"), at least one direction of traffic flow, number of lanes, etc.

Typically, such digital maps of transportation networks are created by traversing all paths/elements of the transportation network with highly specialized location measuring and recording systems designed for this purpose. Transportation network information can also be gleaned from aerial images or compiled from existing localized digital transportation networks. It is also becoming more common to create, or at least update and/or refine, a digital map utilizing positional information representative of the movements of one or more, although typically a plurality of, location-aware mobile devices over the transportation network over time.

Such positional information is commonly referred to as "probe data" (or "probe traces"). Each trace indicates a geographic position of each mobile device against time, i.e. traces the path of the device. A location-aware mobile device, herein referred to simply as a mobile device, is any device capable of determining its geographic location from wirelessly received signals. The received signals may include signals received from satellites of a global navigation satellite system (GNSS), such as GPS signals. The mobile device may be a navigation device such as a portable navigation device (PND), in-vehicle navigation device, mobile phone, portable computing device, vehicle tracking device, and the like. The mobile devices may therefore be associated with a vehicle, but it is also envisaged that the mobile devices could be associated with pedestrians. The navigation device is arranged to record a trace of a path or route followed by the navigation device. The navigation device may store the trace in a local memory of the navigation device or may communicate the trace to a server computer, such as via a wireless data connection with the server computer. The trace may be formed from data indicative of a series of geographic locations at which the navigation device is located at periodic intervals. However in other embodiments the trace may be formed by data representing one or more curves indicative of the path of the navigation device.

The methods of creating, updating and/or refining digital maps using probe data can utilise probe traces as received from the mobile devices (often referred to as "uncoordinated" traces), refined probe traces (i.e. uncoordinated probe traces that have been subjected to one or more of the following: smoothing; adjusting the position of at least portions of the trace depending on the direction of traffic flow, filtering traces not associated with a type of the transportation network), one or more bundles each comprising a plurality of traces, or any combination thereof. Bundles of probe traces are formed from a plurality of individual probe traces, uncoordinated or refined, which traverse a path having the same beginning and end within a spatial threshold value and which do not deviate, in location, by more than a threshold from a reference probe trace (e.g. a probe trace passing through a densely populated area of probe traces). In other words, a probe trace bundle is a single probe trace that represents a plurality of individual probe traces; and may be used beneficially in the creation, updating and/or refinement of a digital map.

Despite substantial steps being taken in automating the creation and updating of digital maps, it still remains useful to manually check and validate change requests that may be received. A change request is a message that may originate from a user or which may be automatically generated (e.g. from a comparison of recently received probe data with the current digital map database no) and which indicates a feature of the digital map database no longer matches the real-world transportation network it represents. The change request may, for example, indicate that: a new navigable segment now exists in reality; a navigable segment in the map database no longer exists in reality; the course (i.e. geometry) of a navigable segment has changed; and/or an attribute associated with a navigable segment has changed, such as allowable directions of traffic flow (i.e. a one-way road is now a two-way road), allowable manoeuvres, etc. Once a change request has been validated, i.e. the change indicated in the message has been manually determined to be correct, then the digital map can be updated accordingly.

One way in which individuals can validate a change request is by looking at a visualisation of probe traces, optionally superimposed over a representation of the digital map; thereby showing recent traffic flow for a given road segment or intersection.

Many techniques are known to extract road network characteristics or road network usage from probe, together with ways of visualising such probe traces, including but not limited to traffic density, traffic flow direction, traffic over time analysis and change detection, average speed and road altitude.

Figure 1:
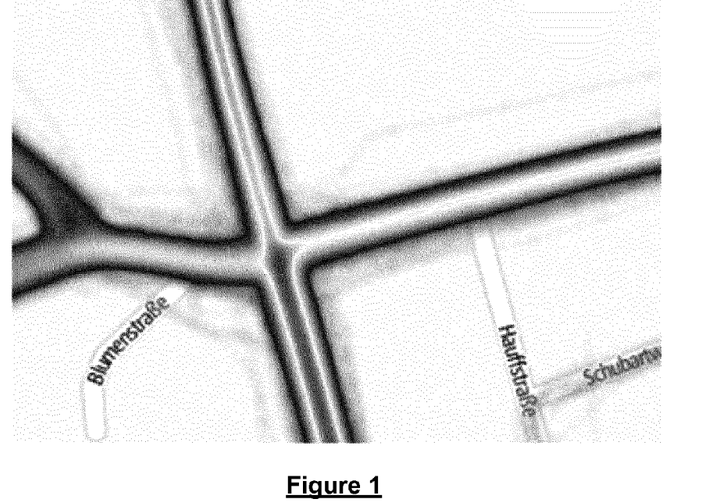
FIG. 1 is a density heat map derived from trace data acquired from a plurality of mobile devices.
Figure 2:
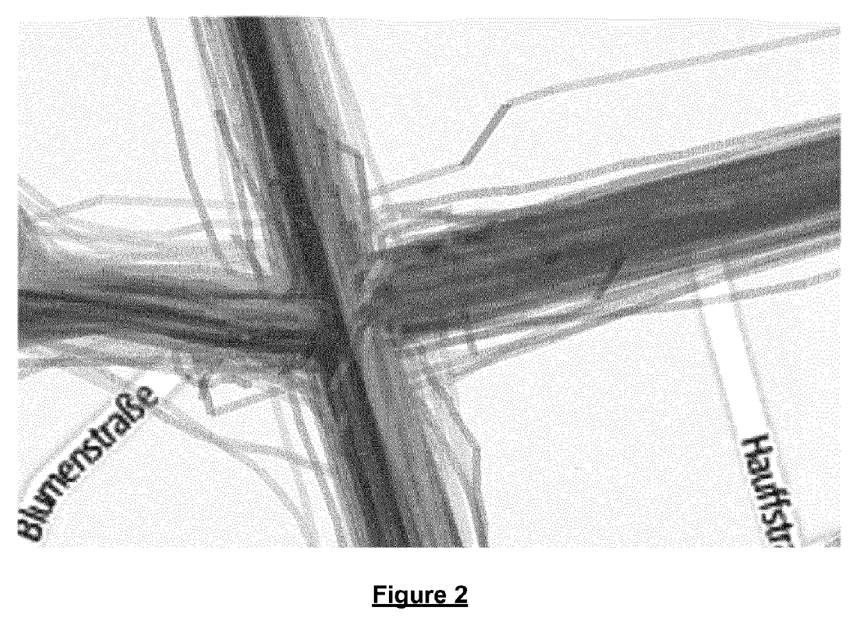
FIG. 2 is traffic flow map derived from trace data acquired from a plurality of mobile devices.

It has been recognised, however, that with the amount of traffic flow data that is now received for a given navigable segment or intersection, changes in traffic that may occur on a given road segment or intersection may be difficult to determine. This is particularly the case with determining changes in allowed and/or prohibited manoeuvres at junctions; which is a required feature of the digital map when used to calculate routes from an origin to a destination. This difficulty is illustrated in FIGS. 1 and 2 in which: FIG. 1 shows a density heat map derived from trace data acquired from a plurality of mobile devices; and FIG. 2 shows a traffic flow map data based on trace data acquired from a plurality of mobile devices. An operator responsible for updating map data stored in the digital map database based on one or more change requests to existing map data, for example, map data associated with FIG. 1 and/or FIG. 2 may be delayed in providing the update to the digital map database because the operator may not be able to perceive the requested change because the trace data has not been refined in order to more easily perceive traffic changes.

In view of the foregoing, there is a need for improved methods and systems for determining trajectories through an area over one or more junctions for display from trace data.

SUMMARY OF THE INVENTION

In accordance with a first aspect of the invention there is provided a method of determining trajectories through at least one junction of a transportation network for display on a visual representation of a digital map, the digital map comprising data that is a digital representation of the transportation network, the method comprising:

obtaining positional information relating to the movement of a plurality of mobile devices with respect to time on the transportation network through an area comprising the at least one junction, the border of the area being divided into a plurality of segments;

using said positional information to create an entry histogram by determining a count of positional information that enters the area at each segment of the border and to create an exit histogram by determining a count of positional information that exits the area at each segment of the border;

connecting one or more sequences of segments along the border having non-zero entries in the entry histogram to define at least one entry gate;

connecting one or more sequences of segments along the border having non-zero entries in the exit histogram to define at least one exit gate; and using said positional information to assign, for pairs of entry and exit gates, a trajectory through the area.

The method is preferably at least in part a computer implemented method. The present invention also extends to a system comprising means for carrying out the steps of the method; the means preferably being a set of one or more processors configured, e.g. programed, for doing so. A given step may be carried out using the same or a different set of processors to any other step. Any given step may be carried out using a combination of sets of processors.

Thus, in accordance with a further aspect of the invention there is provided a system for determining trajectories through at least one junction of a transportation network for display on a visual representation of a digital map, the digital map comprising data that is a digital representation of the transportation network, the system comprising:

means for obtaining positional information relating to the movement of a plurality of mobile devices with respect to time on the transportation network through an area comprising the at least one junction, the border of the area being divided into a plurality of segments;

means for using said positional information to create an entry histogram by determining a count of positional information that enters the area at each segment of the border and to create an exit histogram by determining a count of positional information that exits the area at each segment of the border;

means for connecting one or more sequences of segments along the border having non-zero entries in the entry histogram to define at least one entry gate;

means for connecting one or more sequences of segments along the border having non-zero entries in the exit histogram to define at least one exit gate; and means for using said positional information to assign, for pairs of entry and exit gates, a trajectory through the area.

The present invention in this further aspect may include any or all of the features described in relation to the further aspect of the invention, and vice versa, to the extent that they are not mutually inconsistent. The system may further comprise data storage means, such as computer memory, for storing, at least temporarily, for example, the digital map, the positional information, the determined histograms, etc.

In accordance with the invention, therefore, positional information or "probe data" relating to the movement of a plurality of mobile devices with respect to time over one or more junctions of a transportation network is selected and processed to determine trajectories of travel over the one or more junctions. The determined trajectories can then be used, for example by being displayed over a visual representation of the digital map, to identify and/or validate the geometry of the transportation network represented in the digital map, and to identify and/or validate the possible manoeuvres that can be made at the one or more junctions.

References to "junctions" herein should be understood to refer to portions of the transportation network at which three of more segments meet; or in other words a portion of the transportation network where a mobile device can make two or more distinct manoeuvres. The terms "junctions" and "intersections" are used interchangeably throughout the specification.

In some embodiments the step of obtaining the positional information may comprise receiving the positional information from the plurality of mobile devices. In other embodiments the step of obtaining the positional information comprises accessing the data from a data store, i.e. the positional information having been previously received and stored.

The positional information for a device, as discussed above, may comprise a plurality of time-stamped positions, i.e. indicating a geographic position of the mobile device against time. The positional information may be "live" positional information, which is information recently received from devices, e.g. within the last 5, 10 or 15 minutes, and is thus indicative of current traffic conditions. Additionally, or alternatively, the positional information may be "historic" positional information, which is information collected over a longer period of time, e.g. weeks or months.

As discussed above, the positional information may comprise a plurality of traces, each trace representing the movements of a single mobile device over time. Additionally, or alternatively, the positional information may comprise a plurality of bundled probe traces, each bundle representing aggregated movements of a plurality of mobile devices over time.

The algorithm used in the method of the present invention starts with the creation of a direction aware density histogram over the border of the area from the positional information. The area may be predefined, e.g. a predetermined area associated with a junction in the digital map, or may be defined by an operator. The area may be a polygon, such as a square or rectangle, or may be circular, such as a circle or ellipse. The border of the area is divided into a plurality of segments, preferably each segment being of the same size, and each bin of the histogram preferably represents one of the segments.

The density histogram is direction aware in that the histogram comprises an "entry" histogram that logs positional information representing the movement of devices entering the area and an "exit" histogram that logs positional information representing the movement of devices exiting the area. Accordingly, the entry histogram is created by determining a count of positional information that enters the area at each segment of the border, and the exit histogram is created by determining a count of positional information that exits the area at each segment of the border. The count may simply be indicative of the number of traces, or may be a weighted count, e.g. based on the number of devices within each bundle (bundle density), the quality of the bundle (based on the age, accuracy, etc of the traces within the bundle), etc.

One or more "entry" gates are next determined from the entry histogram. Each entry gate is defined by connecting sequences of segments along the border of the area that have non-zero entries, i.e. have non-zero densities, in the entry histogram. In other words, each gate preferably comprises a plurality of segments; thus preferably individual non-zero entries in the histogram that fall between zero entries are ignored. Similarly, one or more "exit" gates are determined from the exit histogram, with each exit gate being defined by connecting sequences of segments along the border of the area that have non-zero entries in the exit histogram.

In preferred embodiments, every "gate pair", i.e. each pair of determined entry and exit gates, is associated with the positional information that enters the area through the entry gate and exits the area through the exit gate. It will therefore be appreciated that each gate pair is assigned a different subset of the obtained positional information. It will also be appreciated that not all pairs of entry and exit gates will therefore always be assigned a trajectory. For example, at many junctions only certain manoeuvres can be made, and thus an entry gate may only lead to a subset of the determined exit gates.

A trajectory through the area is assigned to each gate pair using the associated subset of positional information, or at least for those gate pairs for which there is associated positional information. The trajectory may be created by selecting any one of the probe traces or bundles of probe traces (from the associated subset of positional information) at random, or one of the probe traces or bundles may be selected based on one or more of their characteristics, e.g. bundle density, bundle quality parameters, etc. Alternatively, the trajectory may be created by grouping some or all of the probe traces or bundles, e.g. though an averaging process or a weighted averaging process based on properties of each of the individual probe traces or bundles.

The assigned trajectory for at least one, and preferably each, gate pair can be displayed on a visual representation of the digital map. Accordingly, rather than an operator being presented with a visualisation of each of the probe traces or bundles through the at least one junction as known in the art (and in which the abundance of lines obfuscate the actual paths travelled through the area), they instead only see the assigned trajectory for each gate pair.

Each trajectory from the same entry gate may be drawn with the same line characteristics, e.g. with the same colour, stroke type, etc, to aid in visualising the different possible paths used by vehicles or pedestrians through the area. Alternatively, and if only trajectories from a single entry gate are shown, each trajectory may be displayed with different line characteristics, e.g. so that the operator can more easily see the possible manoeuvres that can be made at the at least one junction.

The trajectory importance, for example its frequency of use, can be visualized through a second line characteristic, such as the line thickness or variation in the stroke (dotted line, dashed line, full line, etc). In other words, the trajectories may be displayed with a characteristic indicative of the relative proportion of positional information assigned to the pair of entry and exit gates associated with the trajectory.

In embodiments of the invention, only positional information relating to movements of mobile devices through the area at a certain time period may be used to create the trajectories through the at least one junction. By only using positional information relating to a given time range, the trajectories may be used to identify differences in manoeuvres that can be made at certain times of the day or at certain times of the year. Similarly, changes in infrastructure can be detected by comparing the trajectories determined using positional information from a first time period and the trajectories determined using positional information from a second, later time period. For example, if trajectories determined from live positional information are compared with trajectories determined from historical positional information, then it may be possible to provide near real-time evaluation of the effects of road construction works on how vehicles or pedestrians move through an area.

It will be appreciated that the generation of the trajectories is particularly useful to aid a human editor in visualising travel over the at least one junction, e.g. to create, modify or delete a feature from a digital map. Thus, the method preferably further comprises receiving a change request to change or validate one or more attributes of the digital map for a particular junction. The change request may derive from an automatic change detection algorithm that periodically checks the data in the digital map, or may derive from a correction report that is received from a user of a mobile device or from a third party source. The trajectories for the particular junction may be determined in the manner described above in response to the receipt of the change request, or the trajectories may have been previously determined and are retrieved from a data store in response to the receipt of the change request. The trajectories are preferably then displayed superposed on a visualisation of the junction using the digital map, and an operator may then decide to modify or delete the feature from the digital map (within the change request) using the visualisation of the junction with superimposed trajectories, and subsequently perform the change if deemed appropriate.

Whilst the invention has been described primarily in relation to the generation of such trajectories to aid a human editor in visualising travel over the at least one junction, e.g. to create, modify or delete a feature from a digital map, it will also be appreciated that the simplified trajectory may additionally or alternatively be used in an automated process to create and/or validate a feature of the digital map in replace of the individual probe traces or bundles.

It will be appreciated that the methods in accordance with the present invention may be implemented at least partially using software. It will thus be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as a to a satellite or the like.

The present invention in accordance with any of its further aspects or embodiments may include any of the features described in reference to other aspects or embodiments of the invention to the extent it is not mutually inconsistent therewith.

BRIEF DESCRIPTION OF THE DRAWINGS

Various aspects of the teachings of the present disclosure, and arrangements embodying those teachings, will hereafter be described by way of illustrative example with reference to the accompanying drawings, in which.

DETAILED DESCRIPTION OF THE DRAWINGS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

In the following description, illustrative embodiments will be described with reference to acts and symbolic representations of operations (e.g. in the form of flowcharts) that may be implemented as program modules or functional processes include routines, programs, objects, components, data structures, that perform particular tasks or implement particular abstract data types and may be implemented using existing hardware at existing network elements or control nodes (e.g. a database). Such existing hardware may include one or more Central Processing Units (CPUs), digital signal processors (DSPs), application-specific-integrated-circuits, field programmable gate arrays (FPGAs) computers or the like.

Note also that the software implemented aspects of example embodiments are typically encoded on some form of computer readable medium or implemented over some type of transmission medium. The computer readable medium may be magnetic (e.g. a floppy disk or a hard drive) or optical (e.g. a compact disk read only memory, or "CD ROM"), and may be read only or random access. Similarly, the transmission medium may be twisted wire pairs, coaxial cable, optical fibre, or some other suitable transmission medium known to the art. Example embodiments are not limited by these aspects of any given implementation.

Example embodiments of the present disclosure may be described with particular reference to a navigation device (ND) or personal navigation device (PND). It should be remembered, however, that the teachings of the present disclosure are not limited to NDs or PNDs, but are instead universally applicable to any type of processing device that is configured to execute navigation software so as to provide route planning and navigation functionality. It follows, therefore, that in the context of the present application, a navigation device is intended to include (without limitation) any type of route planning and navigation device, irrespective of whether that device is embodied as a PND, a navigation device built into a vehicle, or a computing resource (such as a desktop or portable personal computer (PC), mobile telephone or portable digital assistant (PDA)) executing route planning and navigation software. In addition to street/road networks, example embodiments may be implemented in pedestrian navigation networks and/or any other type of transportation network or combinations of transportation networks (referred to as multimodal transportation networks).

While example embodiments described herein utilize GPS measurements (probe trace points) including latitude and longitude coordinates as location measurements, it should be understood that location measurements may be obtained from any source and are not limited to GPS. For example, other Global Navigation Satellite Systems (GNSS), such as GLONAS, Galileo, etc, or non-GNSS systems, such as inertial indoor systems, computer vision, etc, may be used. Further, while location measurements described herein operate in two spatial dimensions, the discussed example embodiments may be implemented in three or more dimensions.

Figure 3:
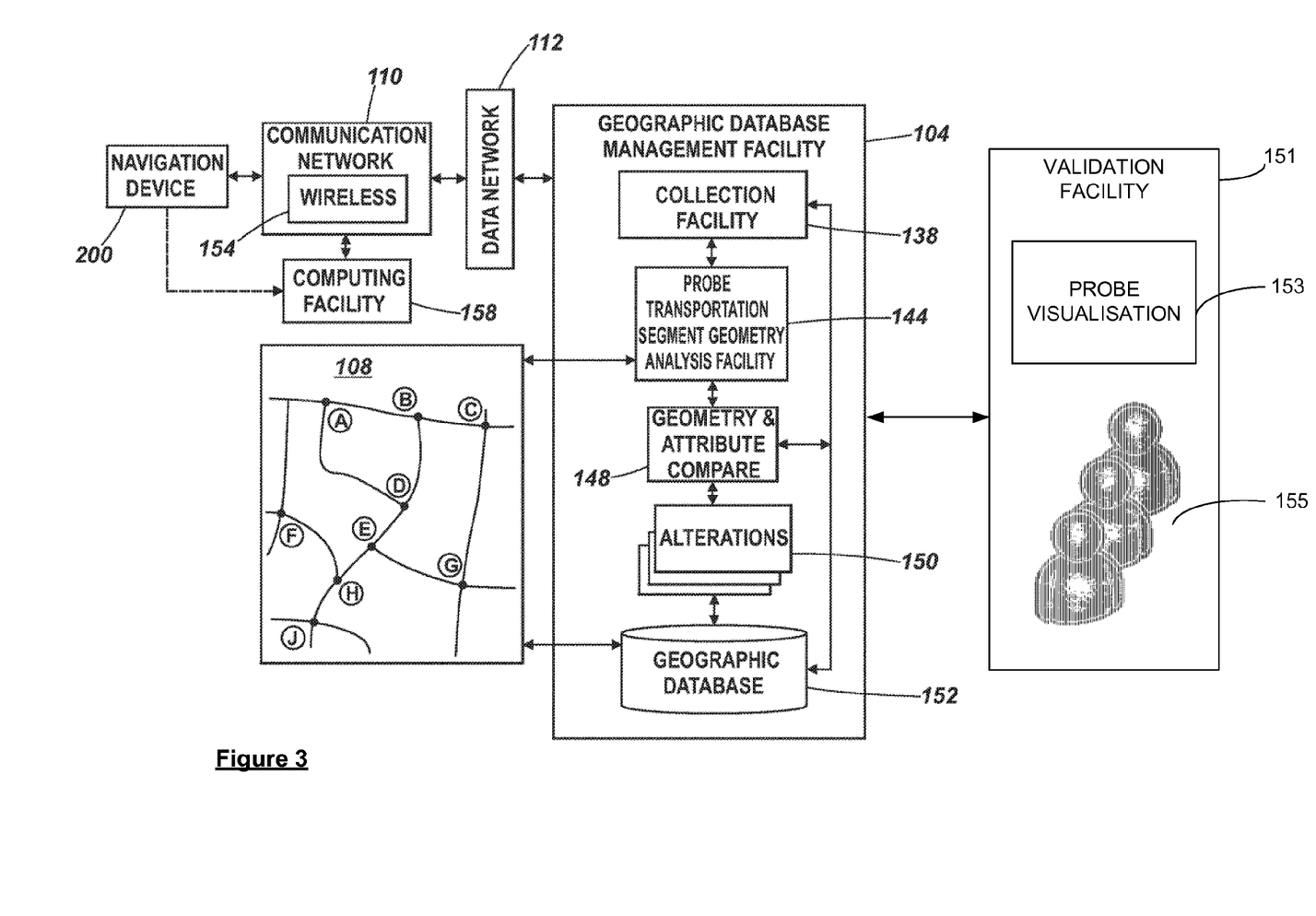
FIG. 3 is a block diagram detailing various component parts of a map database system according to an example embodiment.

FIG. 3 is a block diagram detailing various component parts of a map database system. Referring to FIG. 3, a navigation device (ND) 200 communicates with a geographic database management facility 104 through a communication network 110 and data network 112. The communication network 110 may be a wireless communications network 154 through a service provider (e.g. through a cellular network); a wireless communications network 154 through an area network (e.g. through a Wi-Fi hot spot or WiMAX); a wired connection to a computing facility 158 (e.g. as provided to a home personal computer); or the like.

Still referring to FIG. 3, the geographic database management facility 104 includes a collection facility 138. The collection facility 138 collects road characteristic and/or probe data from a plurality of navigation devices 200, or other non-navigation probe devices (e.g. truck monitoring systems for collection of probe data). As discussed above, probe data may include sequential location measurements such as probe trace points. Probe trace points identify coordinates on the surface of the Earth, which are usually expressed in latitude, longitude and, possibly, altitude (e.g. in meters above sea level). The time at which these measurements were recorded may also be stored. From a sequential set of these measurements, heading, velocity and slope can be derived. Location measurements may be acquired periodically (e.g. every 5 seconds) by the navigation device 200.

Still referring to FIG. 3, acquired probe data is provided to a probe transportation segment geometry analysis facility 144. At the probe transportation segment geometry analysis facility 144, transportation network segment geometry and attributes are inferred from the collected probe data. A geometry and attribute compare unit 148 compares the inferred probe geometry and attributes with geometry and attributes stored in the geographic database 152 to detect and interpret differences. The geometry and attribute compare unit 148 generates alterations 150 that can be applied to both the geometry and attribution of the geographic database 152. Ultimately, alterations 150 may be provided to the geographic database 152 and on to users as a part of an update to a local geographic database of, for example, navigation device 200.

At least in some embodiments, the alterations 150 may first be manually checked and validated by one or more editors 155 before they are applied to the geographic database 152. This is particularly applicable to validating changes in allowable manoeuvres at junctions, i.e. decision points of the transportation network, where you have at least one incoming segment and at least two outgoing segments, or at least two incoming segments and at least one outgoing segment. To assist in the validation of at least some of the generated alterations 150, a validation facility 151 utilises probe traces from the collection facility 138 and the geographic database 152 to generate a visualisation of the collected probe data 153. For example, an editor may receive an alteration (or change request) 150 in relation a specific segment or junction. The editor 155 can then request a visualisation of collected probe data for the segment or junction to study recent traffic flow over the segment or junction, and based on the visualisation confirm that the alteration 150 is correct or not. If the alteration 150 is determined to be correct, then the geographic database 152 is appropriately updated.

The methods used in the probe visualisation 153 are described in more detail below with reference, for example, to FIG. 6. At least in embodiments, however, a validation module is configured to: create a histogram associated with traffic flow for an associated junction from probe trace data; assign entry and exit gate pairs to each trace or bundle associated with the junction; group common traces or bundles for an associated entry-exit gate pair, wherein the grouped common traces or bundles are reduced to a single line representing traffic flow for the associated entry-exit gate pair; and assign one or more distinguishing features to each single line.

Figure 4:
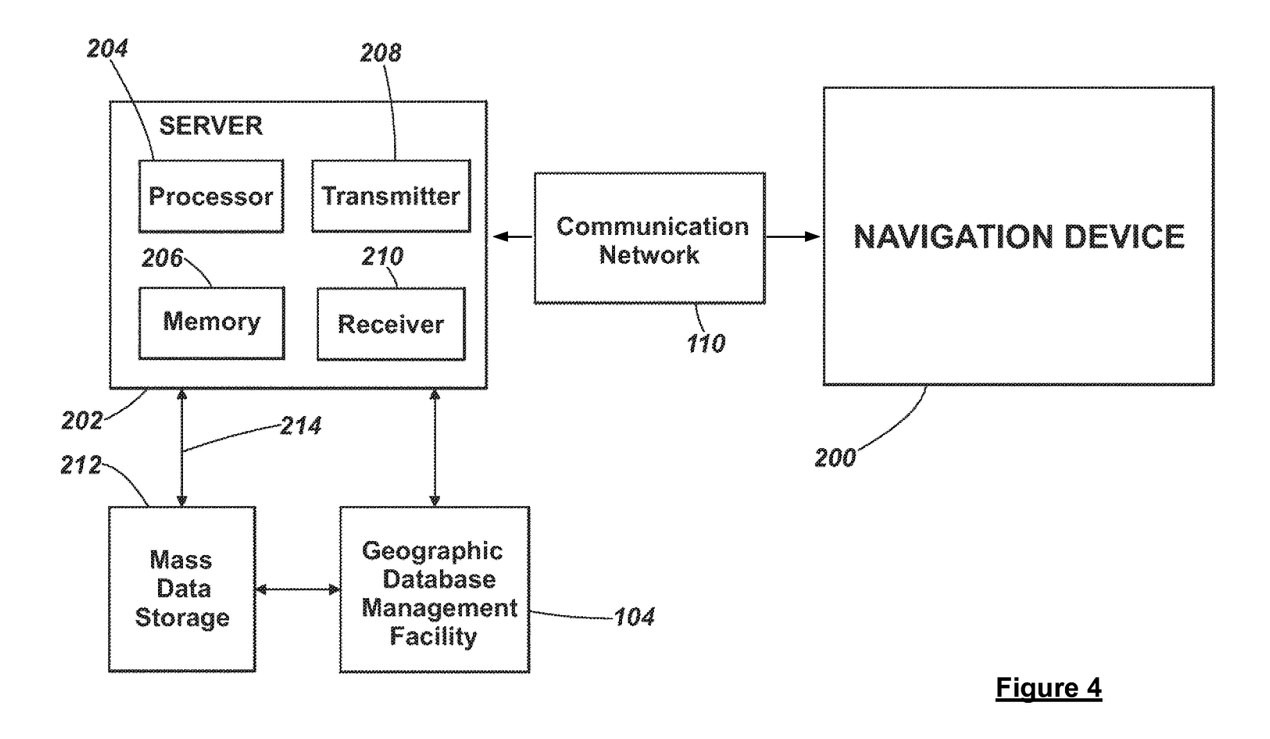
FIG. 4 is a schematic illustration of the manner in which a navigation device may receive or transmit information over a wireless communication channel.

FIG. 4 is a schematic illustration of an example manner in which a navigation device transmits or receives information over a wireless communication channel.

Referring to FIG. 4, the navigation device 200 may establish a "mobile" or telecommunications network connection with a server 202 via a mobile device (e.g. a mobile phone, PDA, and/or any device with mobile phone technology), which is not shown. In so doing, the navigation device 200 may establish a digital connection (e.g. a digital connection via known Bluetooth technology) with the mobile device. Thereafter, the mobile device can establish a network connection (through the Internet for example) with the server 202 through a network service provider. Through the "mobile" network connection, the navigation device 200 and the server 202 may exchange "real-time" or at least very "up to date" information via communication network 110.

The establishing of the network connection between the mobile device (via a service provider) and another device such as the server 202, using the Internet, for example, may be done in a known manner. This may include use of TCP/IP layered protocol for example. The mobile device may utilize any number of communication standards, for example CDMA, GSM, WAN, GPRS (General Packet Radio Service), GSRM, etc.

The navigation device 200 may include mobile phone technology within the navigation device 200 itself (including an antenna or optionally using the internal antenna of the navigation device 200). The mobile phone technology within the navigation device 200 may include internal components as specified above, and/or may include an insertable card (e.g. Subscriber Identity Module (SIM) card), complete with necessary mobile phone technology and/or an antenna for example. As such, mobile phone technology within the navigation device 200 may similarly establish a network connection between the navigation device 200 and the server 202, via the Internet for example, in a manner similar to that of any mobile device.

In FIG. 4 the navigation device 200 is depicted as being in communication with the server 202 via a generic communication network 110 that may be implemented by any of a number of known arrangements.

The server 202 includes a receiver 210 configured to receive sequential location measurements (e.g. probe trace points) from the navigation device 200. The server 202 further includes a processor 204 configured to, inter alia, process received probe data to create and/or update a stored digital map. The processor 204 is operatively connected to a transmitter 208, the receiver 210 and a memory 206. The transmitter 208 and the receiver 210 transmit/receive information to/from the navigation device 200 via the communication network 110. The signals sent and received may include, for example, data, communication, and/or other propagated signals. Although described separately, the functions of the transmitter 208 and the receiver 210 may be combined into a signal transceiver. The processor 204 is also operatively connected to a mass data storage device 212 via a wired or wireless connection 214. The mass storage device 212 may contain a store of navigation data and map information, and may be a separate device from the server 202. Alternatively, the mass data storage device 212 may be incorporated into the server 202. The server 202 is further connected to (or includes) the geographic database management facility 104 described above with regard to FIG. 3.

The navigation device 200 may be adapted to communicate with the server 202 through the communication network 110, and may include at least a processor and a memory as described in more detail below with regard to FIG. 5.

Software stored in the memory 206 may provide instructions for the processor 204 and may allow the server 202 to provide services to the navigation device 200. One service provided by the server 202 may involve, for example, processing requests from the navigation device 200 and transmitting navigation data from the mass data storage 212 to the navigation device 200. Another service provided by the server 202 may include, for example, processing the navigation data using various algorithms for a desired application and sending the results of these calculations to the navigation device 200.

The server 202 may include a remote server accessible by the navigation device 200 via a wireless channel. The server 202 may include a network server located on, for example, a local area network (LAN), wide area network (WAN) and/or virtual private network (VPN). More specifically, for example, the server 202 may include a personal computer such as a desktop or a laptop computer. The communication network 110 may be a cable connected between the personal computer and the navigation device 200. Alternatively, a personal computer may be connected between the navigation device 200 and the server 202 to establish an Internet connection between the server 202 and the navigation device 200. Alternatively, a mobile telephone or other handheld device may establish a wireless connection to the internet, for connecting the navigation device 200 to the server 202 via the internet.

The navigation device 200 may be provided with information from the server 202 via information downloads, which may be periodically updated automatically or upon a user connecting navigation device 200 to the server 202 and/or may be more dynamic upon a more constant or frequent connection between the server 202 and navigation device 200 via a wireless mobile connection device and TCP/IP connection, for example. For many dynamic calculations, the processor 204 may handle the bulk of the processing needs. However, the processor 510 of navigation device 200 (shown in FIG. 5) may also handle processing and calculation, often times independent of a connection to server 202.

The navigation device 200 may also provide information to server 202. For example, navigation device 200 may include hardware and/or software (described in more detail below with regard to FIG. 5) configured to provide probe data to the geographic database management facility 104 via, for example, communication network 110 and server 202.

Figure 5:
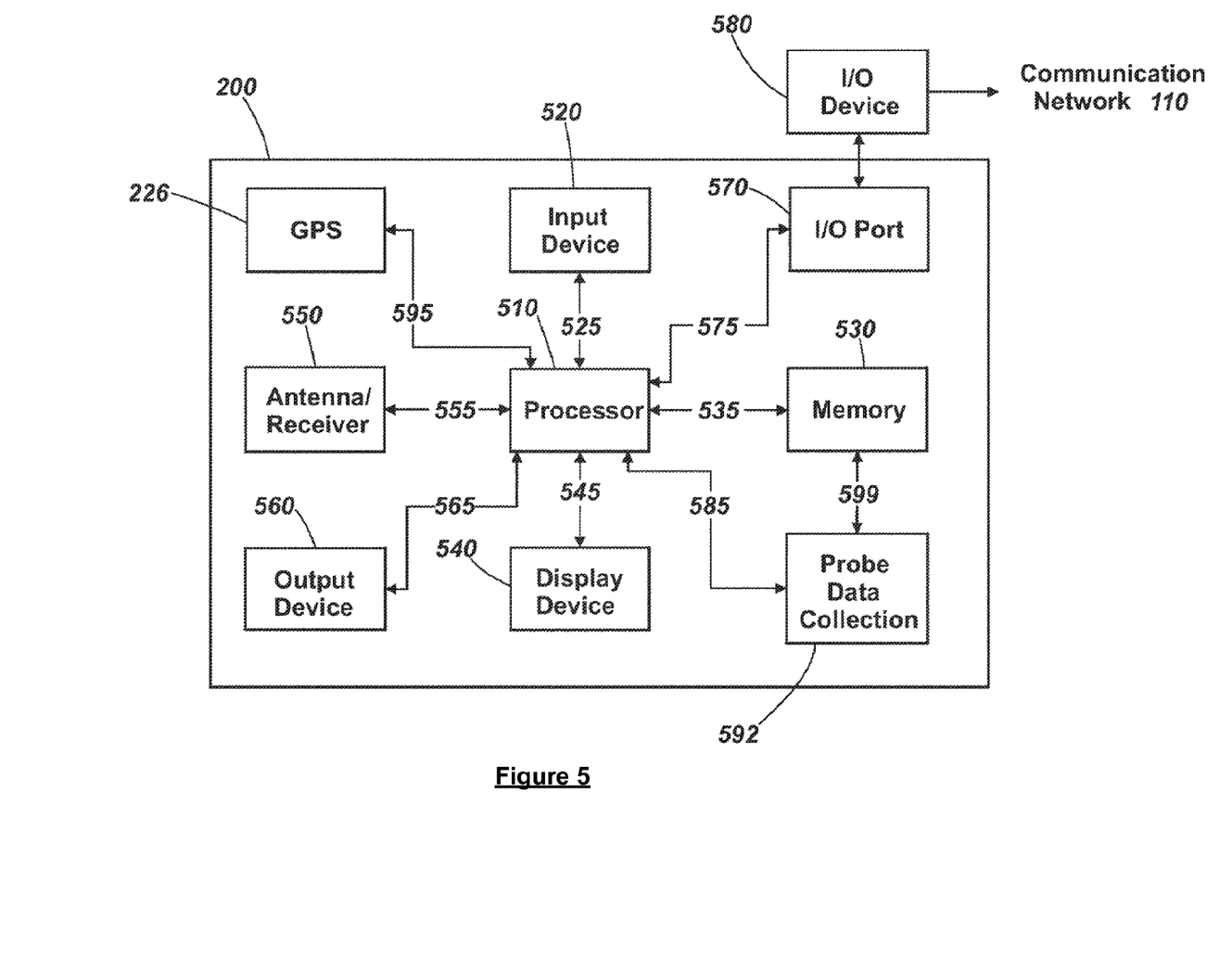
FIG. 5 is a schematic illustration of a navigation device according to an example embodiment.

FIG. 5 is a block diagram illustrating a navigation device according to an example embodiment in more detail. It should be noted that the block diagram of the navigation device 200 is not inclusive of all components of the navigation device, but is only representative of some example components. The navigation device 200 includes a processor 510 connected to an input device 520 and a display screen 540. The input device 520 can include a keyboard device, voice input device, touch panel and/or any other known input device for inputting information. The display screen 540 can include any type of display screen such as an LCD display, for example. In an example arrangement, the input device 520 and display screen 540 are integrated into an integrated input and display device, including a touchpad or touch screen input so that a user need only touch a portion of the display screen 540 to select one of a plurality of display choices or to activate one of a plurality of virtual buttons. The navigation device may include an output device 560, for example an audible output device (e.g. a loudspeaker). Input device 520 can include a microphone and software for receiving input voice commands.

Still referring to FIG. 5, the processor 510 is operatively connected to and configured to receive information from the input device 520 via a connection 525. The processor 510 is also operatively connected to at least one of display screen 540 and output device 560, via output connections 545 and 565, respectively. Further, the processor 510 is operably coupled to a memory resource 530 via connection 535 and is further adapted to receive/send information from/to input/output (I/O) ports 570 via connection 575. The I/O port 570 may be connected to an I/O device 580 external to the navigation device 200.

The memory 530 may include, for example, a volatile memory (e.g. Random Access Memory (RAM)) and a non-volatile memory (e.g. a digital memory, such as a flash memory). The external I/O device 580 may include an external listening device such as an earpiece or the like. The connection to I/O device 580 can further be a wired or wireless connection to any other external device such as a car stereo unit for hands-free operation and/or for voice activated operation for example, for connection to an ear piece or head phones, and/or for connection to a mobile phone.

FIG. 5 further illustrates an operative connection between the processor 510 and an antenna/receiver 550 via connection 555. In one example, the antenna/receiver 550 may be a GPS antenna/receiver. The antenna and receiver designated by reference numeral 550 are combined schematically for illustration. But, the antenna and receiver may be separate components. The antenna may be a GPS patch antenna or helical antenna for example.

The navigation device 200 may use embedded GPS receiver 226 to determine current data (e.g., position, speed, heading, slope, etc.) associated with the navigation device 200. GPS receiver 226 is connected to processor 510 via connection 595. This data, in combination with a local geographic database (e.g., stored in memory 530), may be used to provide a user of the navigation device 200 with information associated with their current travel conditions. This information may include, for example: location in relation to a stored map in the local geographic database; estimated time of arrival given a destination; location of proximate points of interest and information thereof. The probe data collection facility 592 may collect said information from the navigation device 200 and local geographic database over a period of time, and either store the information for later transmission, or transmit the information real-time through the navigation device's 200 communication system, for example, via I/O device 580 and communication network 110. The probe data collection facility 592 is connected to the processor 510 via connection 585. The probe data collection facility 592 is also connected to the memory 530 via connection 599.

Figure 6:
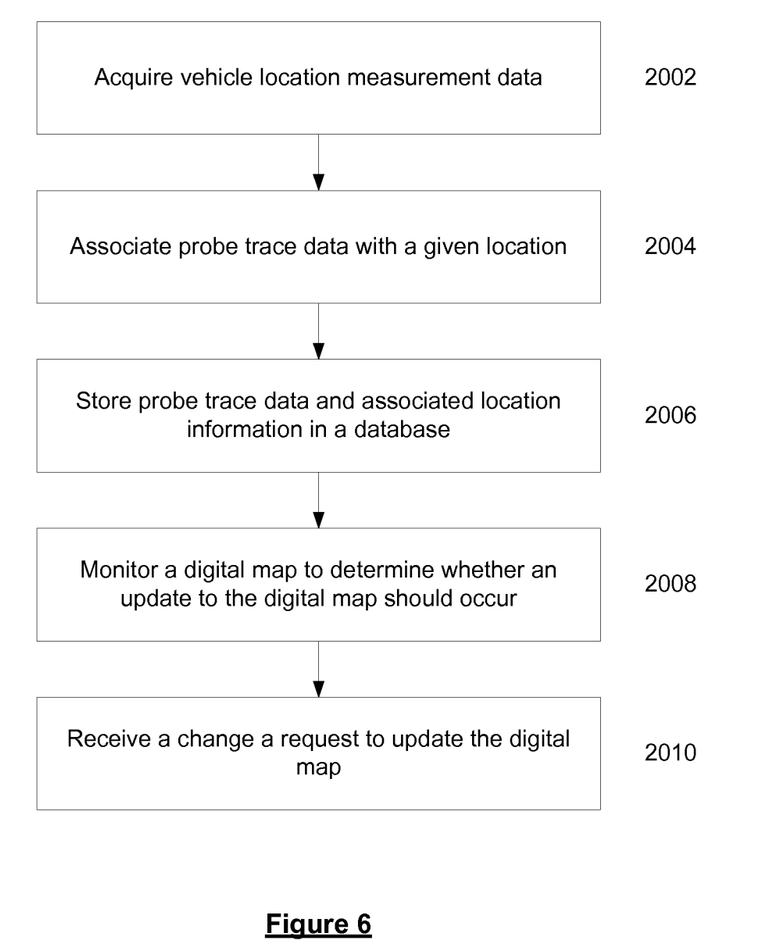
FIG. 6 is a flow chart illustrating a method for acquiring and monitoring probe data to determine whether a map update is required according to an example embodiment.

FIG. 6 is a flow chart illustrating a method for acquiring and monitoring vehicle location measurement data to determine whether a map update is required according to an example embodiment. At 2002, vehicle location measurement data is acquired using location measurement data acquisition devices. The location measurement acquisition devices may include navigation devices 200 and the vehicle location measurement data may include probe traces. In the following discussion, vehicle location measurement data will be referred to as probe traces or probe data. In this embodiment, the acquired probe traces are transmitted to the server 202 via communications network 110.

At 2004, the acquired probe traces are associated with locations on a digital map in which the probe traces were acquired. For example, the acquired probe traces may be associated with one or more junctions. At 2006, the acquired probe traces and associated location information for the digital map is stored in a database, such as the geographic database 152.

At 2008, the digital map is monitored to determine whether the digital map should be updated based on a map change request. For example, a route may have been converted from two-way traffic to one-way traffic preventing a left turn at an intersection. Accordingly, a map update may be requested automatically or by user request after viewing the change in traffic flow for the intersection.

At 2010, a change request is received to change one or more aspects of map data for an associated junction.

Once a change request is received, the validation facility 151 may be employed to provide trajectory and map information derived from the acquired probe traces and associated location information for a designated junction in a manner that is clearly visible by operators. Accordingly, operators can use the trajectory and map information produced by the probe visualisation module 153 to verify map data, determine whether changes have occurred to traffic or traffic patterns associated with the map data and provide updates to the map data (via, for example, alterations 150).

As will be appreciated, the trajectories may be determined dynamically in response to receiving the change request, or alternatively may be determined in advance, e.g. on a periodic basis, and stored in the geographic database 152 or a database associated therewith.

Thus, for example, a user 155 may desire to create or validate an attribute associated with a junction in the geographic database 152, e.g. after having received a change request for the junction, and makes a request to view the trajectories for the junction with the probe visualisation module 153. In response to the request the user is shown the trajectories (which may have been determined following the response or retrieved from a data store) on a display device. The user can then use the displayed trajectories to respond to the change request by creating or validating the attribute for the junction using suitable input means, e.g. keyboard, mouse, etc.

Figure 7A:
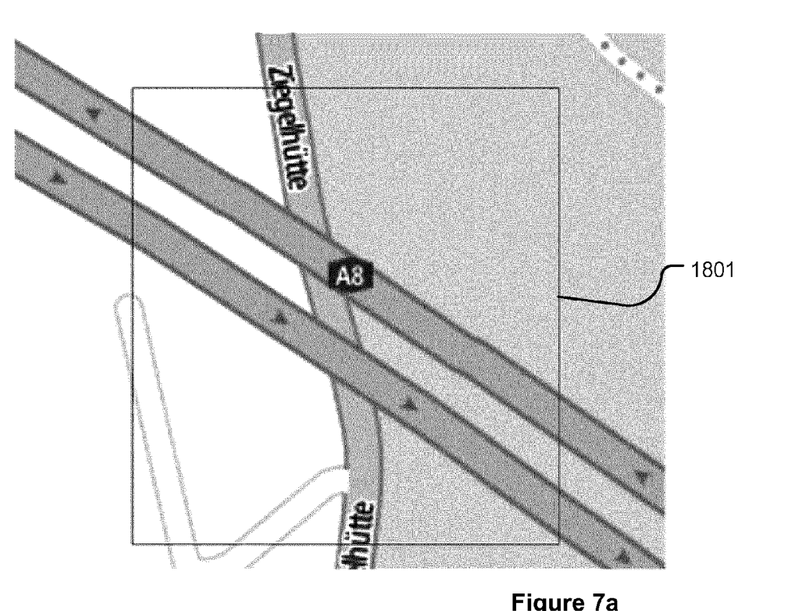
FIG. 7a illustrates the area associated with a junction.
Figure 7B:
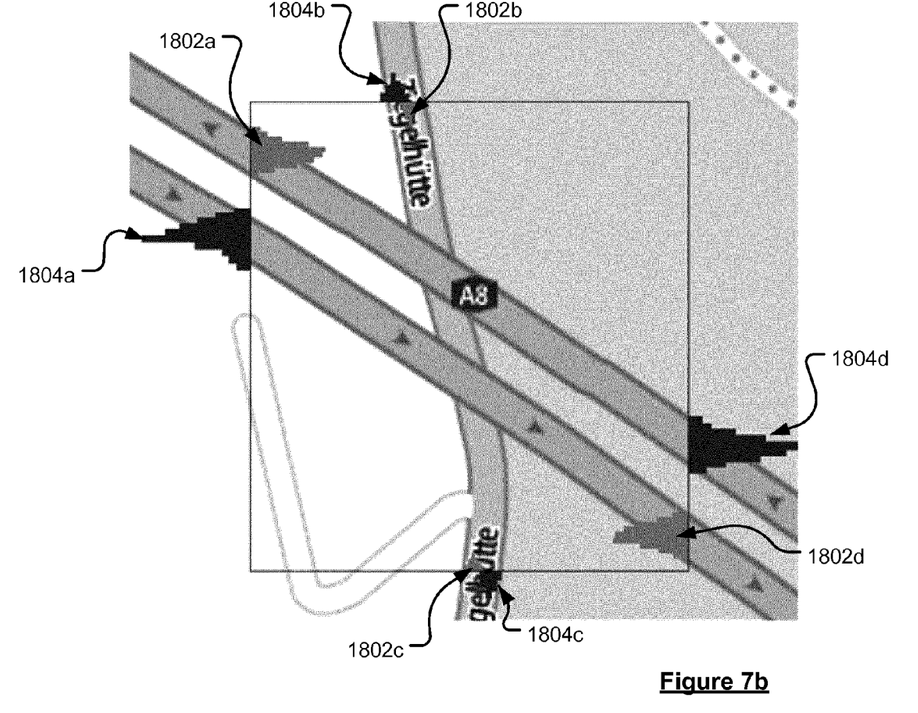
FIG. 7b illustrates the entry and exit density histograms determined for the area according to an embodiment.

In order to extract and display driving trajectories through an area over one or more junctions from probe data, e.g. GPS trace data, associated with the transportation network in a refined manner, a defined monitoring area associated with the junctions, for example the defined monitoring area 1801 illustrated in FIG. 7a, is created. In FIG. 7b, a visual representation of a determined density histogram is shown along the border of the monitoring area 1801; the density histogram being determined from the probe data. The portions of the histogram denoted as 1802a, 1802b, 1802c and 1802d show segments of the border at which mobile devices (from which the probe data is obtained) entered the area 1801. The portions of the histogram denoted as 1804a, 1804b, 1804c and 1804d show segments of the border at which mobile devices exited the area 1801.

Figure 8:
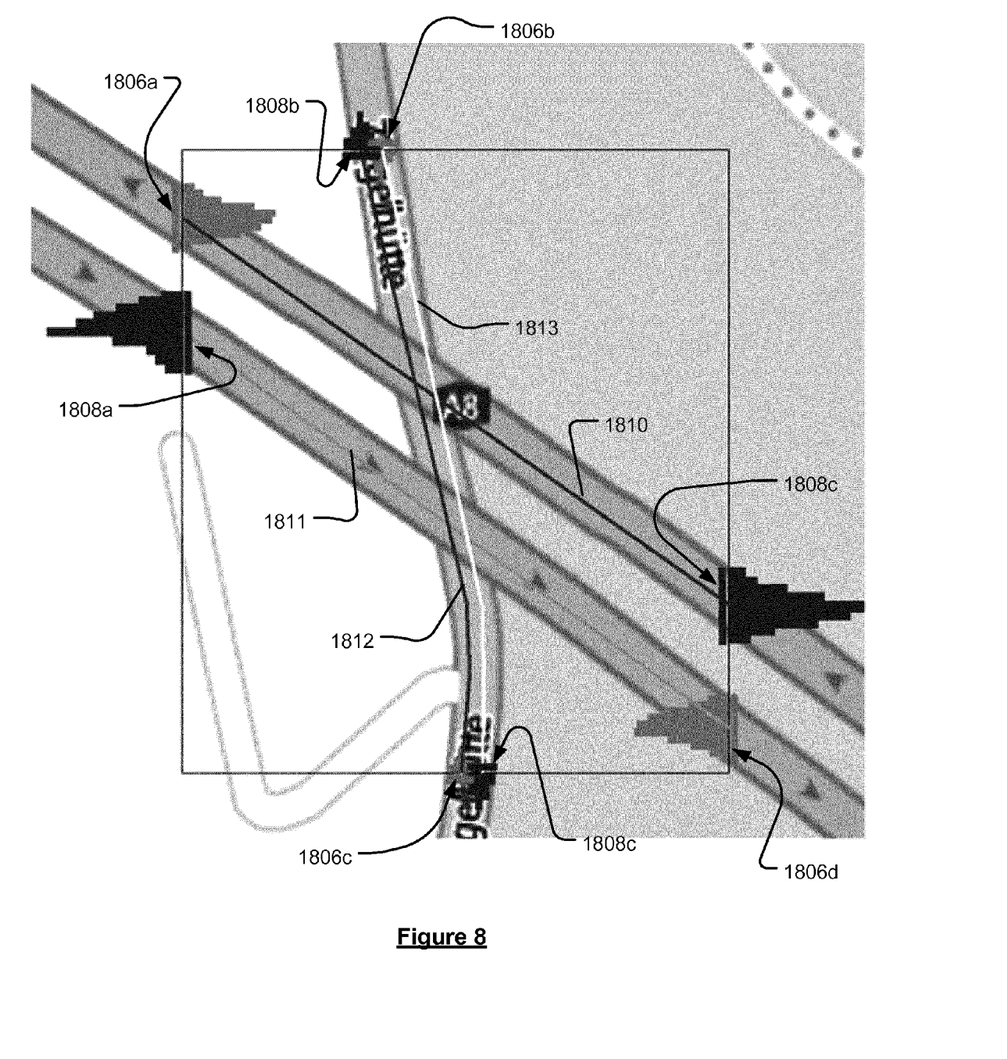
FIG. 8 further illustrates the entry and exit gates, together with assigned trajectories of traces associated with the entry and exit gates, according to the embodiment of FIGS. 7a and 7b.

Entry and exit gates are determined from the density histogram with the gates being identified as sequences of connecting segments of the border with a non-zero density. The entry and exit gates for the histogram shown in FIG. 7b is illustrated in FIG. 8, wherein the entry gates are denoted as 1806a, 1806b, 1806c and 1806d, and the exit gates are denoted as 1808a, 1808b, 1808c and 1808d. Each pair of entry and exit gates is assigned the probe data, if any, that enters the area 1801 through the relevant entry gate and exits the area 1801 through the relevant exit gate. A single trajectory is then assigned to each gate pair using the associated probe data. The single trajectory may be a single trace or bundle from the probe associated with the gate pair, or alternatively the single trajectory may derived from applying a grouping process, such as averaging, to some or all of the probe data. The trajectories for the junction within the area 1801 are shown in FIG. 8 and consist of: trajectory 1810 between entry gate 1806a and exit gate 1808c; trajectory 1811 between entry gate 1806d and exit gate 1808a; trajectory 1812 between entry gate 1806c and exit gate 1808b; and finally trajectory 1813 between entry gate 1806b and exit gate 1808c.

Figure 9:
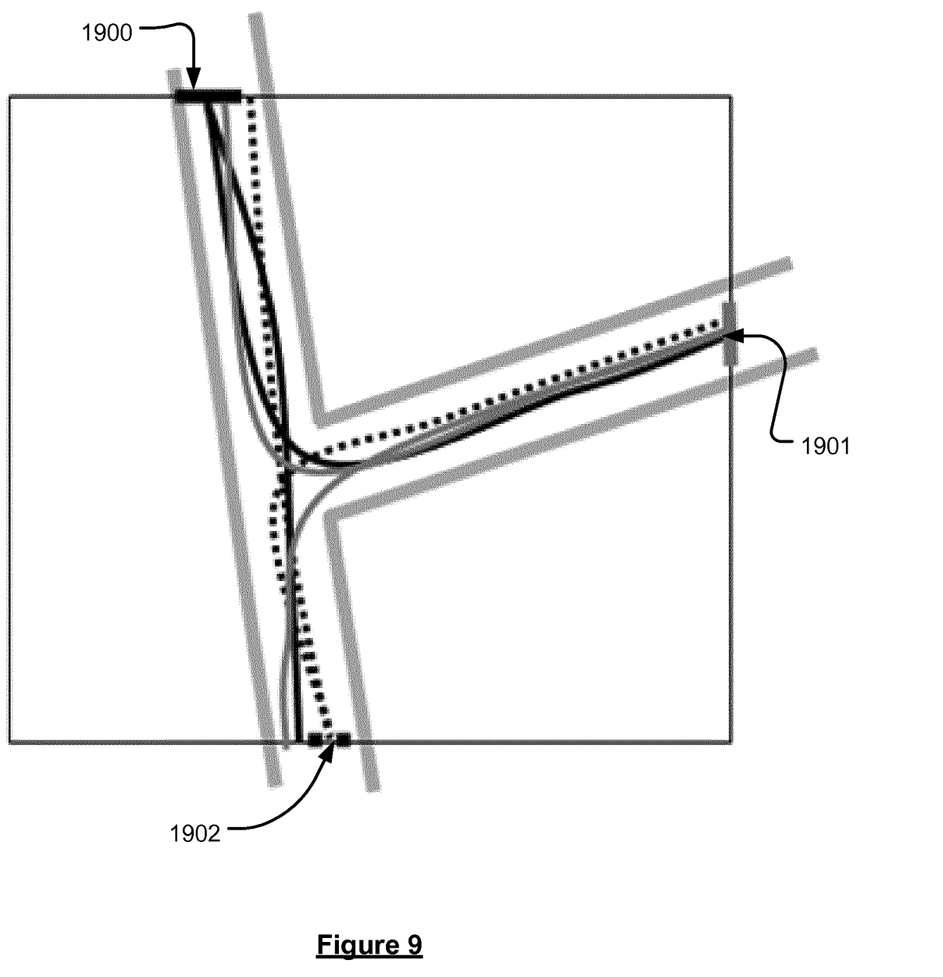
FIG. 9 is an exemplary optimised (or refined) trace map for a junction showing the determined entry and exit gates and associated trajectories.

FIG. 9 is an exemplary optimised (or refined) trace map for a junction showing the determined entry and exit gates and associated trajectories. As can be seen each trajectory for a given entry-exit gate pair has been reduced to a single line for display to the operator using the method described above. Each trajectory leaving an entry gate may be assigned a distinguishing feature, for example, a different colour or different stroke style, in order to be easily identifiable to the operator. For example, as shown in FIG. 9, each trajectory originating at the respective entry gates 1900, 1901, 1902 are shown in the same distinct manner: solid black lines from gate 1900; solid grey lines from gate 1901; and dotted black lines from gate 1902. In other embodiments (not shown), each trajectory may be displayed in a manner taking account of a frequency in which a trajectory from a give entry-exit pair is utilized by assigning a different distinguishing feature, for example, a different line thickness. Accordingly, an operator may easily view which paths of traffic for a given junction have a higher frequency of use.

Figure 10:
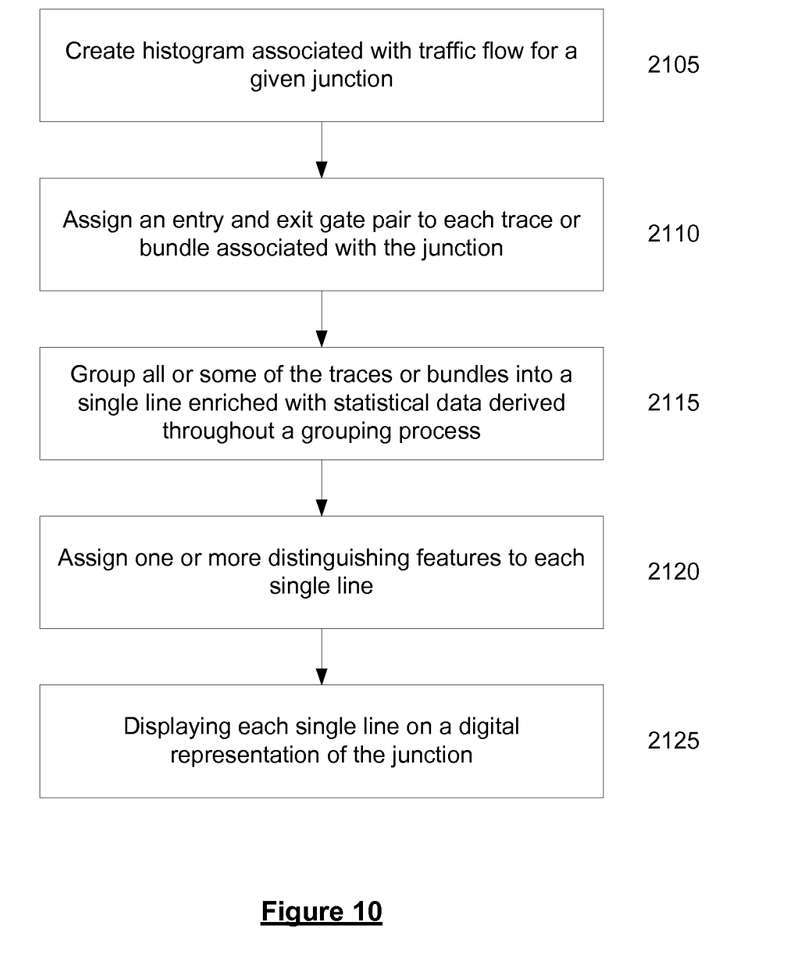
FIG. 10 is a flow chart illustrating a method for extracting and displaying driving trajectories through an area over one or more junctions from GPS trace data in a refined manner according to an embodiment.

FIG. 10 is a flow chart illustrating a method for extracting and displaying driving trajectories through an area over one or more junctions from GPS trace data in a refined manner according to an example embodiment. At step 2105, a histogram associated with traffic flow for a defined monitoring area associated with a junction is created from probe trace data is created. At step 2110, entry and exit gate pairs are determined from the histogram, and are assigned the relevant traces or bundles associated with the defined monitoring area. At step 2115, common traces or bundles for an associated entry-exit gate pair are grouped and reduced to a single line representing traffic flow for the associated entry-exit gate pair. At step 2120, one or more distinguishing features are assigned to each single line based on one or more predetermined criteria, for example, colour and/or line thickness. Finally, at step 2125, each single line is displayed on a digital representation of the junction.

By providing refined trajectory detection in addition to providing an easily identifiable visualization of manoeuvres and traffic flow for a given junction, the time needed for manoeuvre validation by an operator is reduced. Accordingly, an operator managing map data for a given road network may provide faster and more accurate map updates because manoeuvres and traffic flow for a given junction are more easily perceivable. In addition, the further refinement of GPS traces or bundles described above allows for the extraction of more advanced trajectory characteristics, e.g. trajectory use throughout the day or trajectory changes over time.

Methods according to example embodiments described above may be implemented at least in part in the form of a device, such as a server. For example, the trajectories for one or more junctions within an area may be created at a server, e.g. in response to a request, or on a periodic basis, and the trajectories may be stored in a memory of the server. The memory may then be accessed by another computing device to access and obtain relevant trajectories in response to a received request from a user or a software application.

It will be appreciated that whilst various aspects and embodiments of the present invention have heretofore been described, the scope of the present invention is not limited to the particular arrangements set out herein and instead extends to encompass all arrangements, modifications and alterations thereto. It should therefore be noted that whilst the accompanying claims set out particular combinations of features described herein, the scope of the present invention is not limited to the particular combinations hereinafter claimed, but extends to encompass any combination of features or embodiments herein disclosed irrespective of whether or not that particular combination has been specifically enumerated in the accompanying claims at this time.

The invention claimed is:

1. A system for determining trajectories through at least one junction of a transportation network for display on a visual representation of a digital map, the digital map comprising data that is a digital representation of the transportation network, the system comprising one or processors arranged to:
    obtain positional information comprising a plurality of traces relating to the movement of a plurality of mobile devices with respect to time on the transportation network through an area comprising the at least one junction, the border of the area being divided into a plurality of segments;
    use said positional information to create an entry histogram by determining a count of the traces entering the area at each segment of the border and to create an exit histogram by determining a count of the traces exiting the area at each segment of the border;
    connect one or more sequences of segments along the border having non-zero entries in the entry histogram to define at least one entry gate;
    connect one or more sequences of segments along the border having non-zero entries in the exit histogram to define at least one exit gate;
    use said positional information to assign, for pairs of entry and exit gates, a trajectory through the area; and
    display, on a display device of the system, at least one of the determined trajectories through the area superimposed on a visual representation of at least the portion of the digital map representative of the area.

2. The system of claim 1, wherein the positional information is positional information relating to the movement of a plurality of mobile devices with respect to time in a given time period.

3. The system of claim 1, wherein the positional information comprises a plurality of traces, each trace composed of a plurality of time-sampled geographic positions.

4. The system of claim 3, wherein the trajectory for a pair of entry and exit gates comprises one of the traces of the positional information associated with the pair of entry and exit gates.

5. The system of claim 3, further comprising grouping some or all of the traces of the positional information associated with a pair of entry and exit gates to determine the trajectory for the pair of entry and exit gates.

6. The system of claim 1, further comprising storing the determined trajectories in a data storage device.

7. The system of claim 1, wherein the trajectories originating from the same entry gate are displayed using at least one common characteristic.

8. A non-transitory computer readable medium having computer software stored thereon, said computer software operable, when executed on a computer, to cause the computer to perform a method of determining trajectories through at least one junction of a transportation network for display on a visual representation of a digital map, the digital map comprising data that is a digital representation of the transportation network, the method comprising:
    obtaining positional information comprising a plurality of traces relating to the movement of a plurality of mobile devices with respect to time on the transportation network through an area comprising the at least one junction, the border of the area being divided into a plurality of segments;
    using said positional information to create an entry histogram by determining a count of the traces entering the area at each segment of the border and to create an exit histogram by determining a count of the traces exiting the area at each segment of the border;
    connecting one or more sequences of segments along the border having non-zero entries in the entry histogram to define at least one entry gate;
    connecting one or more sequences of segments along the border having non-zero entries in the exit histogram to define at least one exit gate;
    using said positional information to assign, for pairs of entry and exit gates, a trajectory through the area; and
    displaying, on a display device, at least one of the determined trajectories through the area superimposed on a visual representation of at least the portion of the digital map representative of the area.

9. The non-transitory computer readable medium of claim 8, wherein the positional information is positional information relating to the movement of a plurality of mobile devices with respect to time in a given time period.

10. The non-transitory computer readable medium of claim 8, wherein the positional information comprises a plurality of traces, each trace composed of a plurality of time-sampled geographic positions.

11. The non-transitory computer readable medium of claim 8, wherein the trajectory for a pair of entry and exit gates comprises one of the traces of the positional information associated with the pair of entry and exit gates.

12. The non-transitory computer readable medium of claim 8, further comprising grouping some or all of the traces of the positional information associated with a pair of entry and exit gates to determine the trajectory for the pair of entry and exit gates.

13. The non-transitory computer readable medium of claim 8, further comprising storing the determined trajectories in a data storage device.

14. The non-transitory computer readable medium of claim 8, wherein the trajectories originating from the same entry gate are displayed using at least one common characteristic.

15. The non-transitory computer readable medium of claim 14, wherein the at least one common characteristic is line color and/or line style.

* * * * *